United States Patent [19]

Pav

[11] 4,053,419

[45] Oct. 11, 1977

[54] BAND FILTER PRESS

[75] Inventor: Jarmil Pav, Reutlingen, Germany

[73] Assignee: Firma Bruderhaus Maschinen GmbH, Reutlingen, Germany

[21] Appl. No.: 738,077

[22] Filed: Nov. 2, 1976

[30] Foreign Application Priority Data

Nov. 13, 1975 Germany ............................ 2550956

[51] Int. Cl.[2] ............................................ B01D 33/04

[52] U.S. Cl. ...................................... 210/386; 74/241; 100/120; 198/547; 210/DIG. 3; 210/401

[58] Field of Search ............... 210/386, 387, 400, 401, 210/DIG. 3; 100/118, 119, 120; 198/547, 824, 818, 820; 74/241

[56] References Cited

U.S. PATENT DOCUMENTS

| | | | |
|---|---|---|---|
| 396,136 | 1/1889 | Brennan, Jr. | 198/820 |
| 502,523 | 8/1893 | Lockstaket | 100/120 X |
| 1,702,085 | 2/1929 | Kerr | 100/119 X |
| 1,707,998 | 4/1929 | Shaw | 198/824 |
| 2,758,700 | 8/1956 | Plumb | 198/547 |
| 2,988,202 | 6/1961 | Pampel et al. | 198/547 X |
| 3,110,419 | 11/1963 | Atkins et al. | 198/547 X |
| 3,530,791 | 4/1968 | Hotte | 100/120 |
| 3,578,149 | 5/1971 | Thomson | 198/818 |
| 3,851,752 | 12/1974 | Densmore | 198/824 |
| 3,896,030 | 7/1975 | Bahr | 100/118 |

*Primary Examiner*—Theodore A. Granger
*Attorney, Agent, or Firm*—Wigman & Cohen

[57] ABSTRACT

This disclosure relates to a band filter press for separating liquid and solid matter comprising a continuous filter band adapted to receive a mixture of liquid and solid matter and convey it through successive loading, pressing and unloading zones. The filter band is in the form of a hose having a bottom center strip and two cover strips fixedly connected to the edges of the bottom strip and partially covering the same. The cover strips, which may be either integrally formed with the center strip or provided in the form of separate strips which are connected to the center strip at its lateral edges, enclose acute angles with the center strip. The lateral extremities of the connection points between the cover strips and the center strip define finite longitudinally-extending edges by means of which lateral movement of the filter band may be determined and controlled. Stiffening means and support bands insure that the cross-sectional profile of the band will be maintained throughout the various filtering stages.

18 Claims, 14 Drawing Figures

BAND FILTER PRESS

BACKGROUND OF THE INVENTION

This invention relates generally to the filtering art, and more particularly to a band filter press with at least one continuous filter band which passes through a loading zone, a pressing zone and an unloading zone. At least when it passes through the pressing zone, the filter band forms at least the bottom surface of a hose which is adapted to carry the material to be filtered.

Many manufacturing processes, as well as refuse disposal processes and processes for keeping the environment clean include, as their most important component, the separation of the liquid phase from a mixture of liquid and solid matter. For technological and economic reasons, it is ususally endeavored to obtain a high proportion of the dry substance in the remaining material which is usually called filter cake. To obtain a certain proportion of the dry substance in the filter cake may even be the necessary prerequisite for the usability of a separating process. The fact that the separating process may be carried out continuously is often another prerequisite. In the latter case the apparatus used for the separation must be capable of operating continuously.

Among the processes for separating liquids and solid matter, filtration is of special significance for technical as well as economical reasons. Here, it is often advantageous to use a band filer press, especially since this type of press can work continuously.

One of the most important factors in the case of filtration is the effective pressure differential. This pressure differential may be created by means of either an underpressure or an excess pressure. In the case of band filter presses, the material to be filtered is almost exclusively subjected to a mechanically-created compression. For this purpose, the filter band which surrounds the substance to be filtered is led between sets of rolls and/or in a wave-like course over guide rolls or the like.

In order to improve the degree of efficiency of a band filter press, i.e., a larger proportion of the dry substance in the filter cake, the most important factor is to increase the effective pressure differential. However, conventional band filter presses do not permit a significant increase of this pressure differential. If the substance to be filtered is between the two filter bands, an increase of the pressure to which the substance to be filtered is subjected often results in the substance being expressed at the marginal zones of the filter bands. It has previously been suggested to arrange sealing elements along the marginal zones of the filter bands in order to avoid this occurrence. However, these sealing elements were not effective. Moreover, loading of the filter band only within the range of its center zone, so as to inhibit the material from escaping at the edges, also does not permit a significant increase of the efficiency of the band filter press. Apart from the fact that in this case there is a varying thickness of the substance in the transverse direction of the filter band which results in lengthwise zones with varying contents of dry substance, the partial loading of the filter band will result in the fact that the stress in the individual areas will vary considerably. The result is a plastic deformation of the overstressed zone which leads to a considerably reduced useful life of the filter band.

For the extraction of juices from fruit and vegetables, a band filter press of the above-described type has become known in which a leaking-out of the bulk to be dejuiced at the edges of the filter band is to be avoided by bending the two marginal zones of the filter band upward before the entrance into the loading zone and thus forming a U-profile. After the loading, the marginal zones are folded to the inside so that the filter band assumes the shape of a hose. However, an increase in pressure cannot be obtained this way because, under the pressure of the bulk that is to be filtered, the hose does not maintain its shape, but progressively opens up. The result is that the bulk to be filtered leaks out. But even if the bulk to be filtered does not leak out at this point, the uncontrollable change of the width of the hose results in the fact that shifts of the filter band transversely to its running direction, which are unavoidable and require a corresponding control of the band, can no longer be accurately determined and corrected. Effective tracking control of the filter band along its intended course can therefore not be maintained. Finally, the folding of the filter band before the entrance into the loading zone and the unfolding of the unloading zone causes a considerable stress of the filter band within the range of its edges, which will result in a considerable decrease of the useful life of the filter band. In addition, it is practically impossible to carry out the folding process with the necessary precision.

SUMMARY OF THE INVENTION

It is, therefore, a primary object of this invention to provide a band filter press by means of which higher pressure differentials than previously obtainable may be achieved in the substance to be filtered, and thus a higher degree of efficiency, without subjecting the filter band to high stresses and without having difficulties when controlling shifts of the filter band transversely to its running direction.

This object is, according to the invention, accomplished by providing a filter band which consists of a center strip or portion which forms the bottom side of a hose and two cover strips or sidewalk-portions which are undetachably connected with the latter and cover it at least partly.

The formation of a finite edge each at the transition point from the center strip to the two cover strips, together with the manner of connection therebetween prevents a widening of the hose on one hand and thus an opening of the hose and a leaking out of the substance to be filtered. On the other hand, these two edges may be used as tracking control guide edges, since on the basis of their position it can be determined with great precision whether the filter band exhibits a shift transversely to its running direction or is located on the intended course. In addition, because of the fact that the filter band over its whole length has the shape of a hose, excess stresses are avoided within the range of the cover strips and folding as well as unfolding processes.

In a preferred embodiment of the invention, each of the cover strips with the center strip include an acute angle. This results in a very high inherent stability of the hose which permits a further increase of the pressure to which the substance to be filtered may be subjected.

Since the degree of efficiency of the band filter press also depends on the cross-sectional profile of the hose formed by the filter band, it is preferred that at least the cover strips, transversely to the running direction of the filter band, have a stiffness that insures that their shape is maintained. In order not to be required to dimension the filter band, which is for example a metal sieve or a synthetic sieve, on the basis of the requirements in regard to the permeability for the liquid to be led off as well as for the mechanical stiffness required to maintain the shape of the hose, at least the cover strips may be reinforced by means of a stiffening band which rests against them and is tightly connected with them.

Another advantageous possibility to make it easier to maintain the desired shape of the hose, is to provide two support bands, which between each other, take up the hose at least over a part of the length of the filter band. The support bands are flexible, but with regard to the load are developed in a stiff manner vertically to their surfaces which rest against the hose, and are provided with openings for the filtered liquid to pass therethrough.

In order to simplify the construction of the band as well as those elements (e.g., rollers) which function to both guide the band and exert pressure thereagainst, it is advantageous if the center strip and the cover strips are, at least in their center zone, developed to define a cross-sectional profile that is substantially straight-lined and thus free of curves and bends. Moreover, such construction of the filter band is advantageous in that it increases its inherent stability.

The center strip and the two cover strips may be developed in one piece. However, they may also be formed from three separate strips or bands, in which case the cover strips are fixedly connected with the center strip at least along the two edges thereof. The connection may, in this case, be limited to the immediate area of the edge. However, the cover strips may also, with one marginal zone each, rest on the center strip. In the latter case, a secure connection may be obtained in an especially simple manner, because then the strips can be connected with each other over the whole range of the marginal zone. Another possibility is to provide two connecting elements which form the two edges and which connect the cover strips with the center strip. In this case, the strips do not have to be directly connected with each other. In addition, the control edge may be developed in an optional manner; it may, for example, be formed by a completely linear edge of the connection element. In this case, the control edge may also consist of a different material than the filter band.

In order to facilitate loading of the filter band with the substance to be filtered, and especially with only minimal unfolding of the cover strips, the two cover strips, in the preferred embodiment, terminate at a predetermined distance from one another. The gap formed between them is, in this case, at least during the passage through the pressing zone, covered by an additional cover strip or band. This cover band which rests on the outside of the cover strips, also increases the inherent stability of the hose because of the form or friction locking with the cover strips.

Since the cover band cannot be guided through the loading zone, but can only be brought in contact with the filter band beyond the loading zone, a second cover band is provided, in the preferred embodiment, which rests against the inside of the two cover strips and extends from the loading zone to at least that point at which the first cover band comes in contact with the cover strips.

In order to obtain an even filling of the hose formed by the filter band in the loading zone, in a preferred construction a loading device with a filling channel is provided. This filling channel has laterally projecting wall surfaces which extend under and support the cover strips in the loading zone. Within the area of the loading zone the cover strips thus have the desired position in regard to the center strip. It is advantageous if one wall area each which keeps the center strip down adjoins the two wall areas or surfaces which support the cover strips so that the center strip also assumes the desired position. The wall surfaces which keep the center strip down are preferably firmly connected with the legs of a bracket which rests on the center strip in order to obtain the required stability without impairing the loading.

Since the wall surfaces which keep the center strip down, together with the wall surfaces which support the cover strips, prevent feeding of the substance to be filtered into the lateral areas of the hose, the wall surfaces which keep the center strip down preferably extend in the running direction of the filter band only over a part of the length of the wall surfaces supporting the cover strips. The substance to be filtered can then emerge laterally from the filling channel at the end of the shortened wall surfaces.

It is advantageous to construct the back wall of the filling channel so that it can be swivelled and to couple it with a signal transmitter of a regulator for loading predetermined quantities. Since the pressure exercised on the hinged back wall by the substance being loaded depends on the quantity of the substance, the filling channel may be constructed in such a way that the back wall performs a swivelling motion when the fed quantity of the substances exceeds the predetermined value.

With the above and other objects in view that may become apparent hereinafter, the nature of the invention will be more clearly understood by reference to the attached drawings, the following detailed description thereof and the appended claimed subject matter, wherein:

DETAILED DESCRIPTION OF PREFERRED EMBODIMENTS

Figure 1:
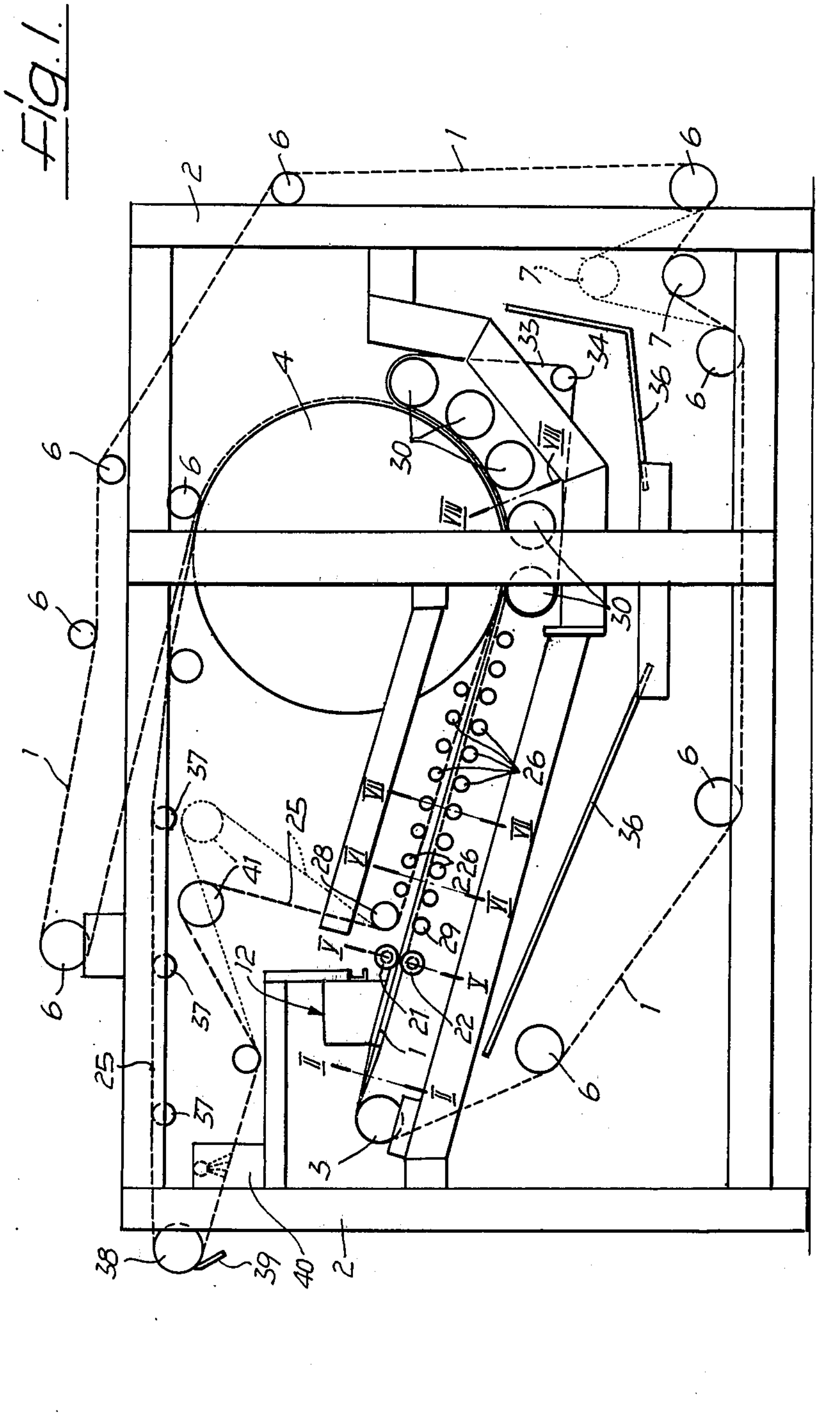
FIG. 1 is an elevation view of a schematic representation of the band filter press of this invention.

Referring now to the drawings in detail, there is illustrated in FIG. 1 a band filter press constructed in accordance with this invention by means of which sludge, for example, may be drained. The filter press includes a continuous filter band 1 movable along a predetermined path of travel and adapted to pass through successive loading, pressing and unloading zones.

The band filter press includes a frame 2 in which a guide roller 3 is rotatably mounted about a horizonal axis. The filter band 1 extends from the guide roller 3 along a path which extends downwardly at about a 15° angle from the horizontal through the loading and pressing zones to a drum 4 which is also mounted in the frame 2 about a horizontal axis of rotation. The filter band 1 extends upwardly about the periphery of the drum 4, over about half of its circumference, and then is removed from the top of the drum and passes about a plurality of guide rollers 6 and a tension roll 7 back to the underside of the initial guide roller 3.

Figure 2:
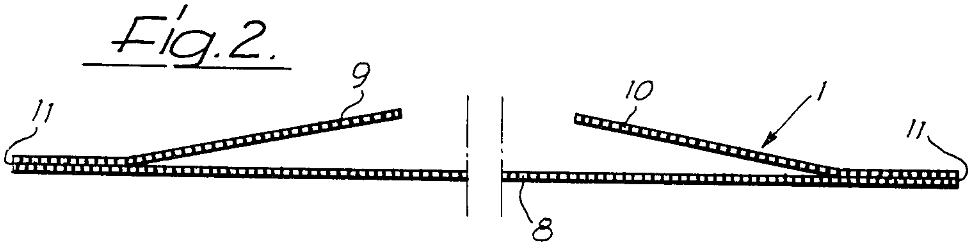
FIG. 2 is an enlarged cross-sectional view taken along line II—II of FIG. 1, and illustrates one embodiment of the filter band of this invention.

As shown in FIG. 2 the filter band 1 comprises a center strip 8, the width of which determines the width of the first filter band 1, and two cover strips 9 and 10 the width of each of which is less than half the width of the center strip 8. The two cover strips 9 and 10, which extend parallel to the center strip, have marginal portions thereof resting on correspondingly wide marginal portions of the center strip 8 and are, within the range of these marginal zones, firmly connected with the center strip 8. As shown in FIG. 2, the cover strips 9 and 10 are flush with the edges of the center strip 8 so that on both sides thereof there is provided a straight-lined edge 11 which serves as control edge in order to be able to determine any shifting of the filter band transversely to its running direction and to be able to eliminate such lateral shifts, so that the first filter band 1 can be maintained in its predetermined path. The remaining portions of the cover strips 9 and 10 are bent in such a way that together with the center strip 8 they enclose acute angles which open toward the center of the center strip 8. In the disclosed embodiment these angles are less than 45°.

Thus, the filter band 1 forms a hose which is open on its upper side, in which case the width of this longitudinally extending opening is at least equal to half the width of the center strip 8.

Figure 3:
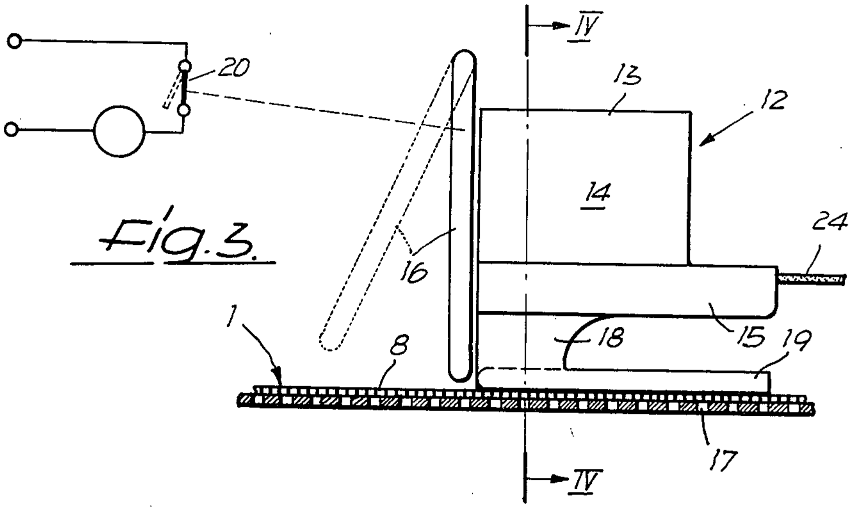
FIG. 3 is a vertical sectional view taken through the filter band as it passes through the loading zone, and illustrates details of the loading device and its automatic control mechanism.
Figure 4:
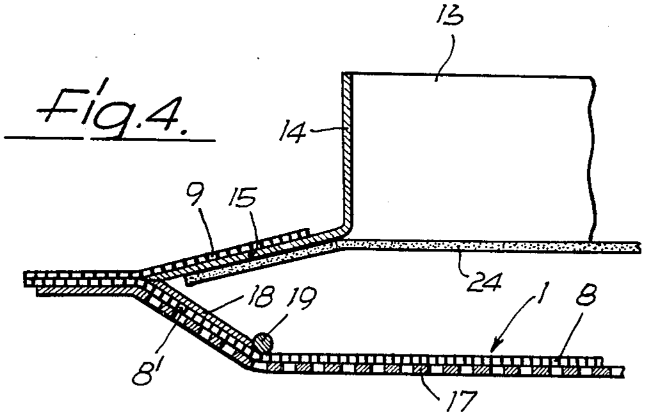
FIG. 4 is a fragmentary sectional view taken along line IV—IV of FIG. 3, and illustrates details of the manner in which the loading device maintains the hose-shaped filter band in open position during the loading operation.

After leaving the guide roller 3, the first filter band 1 first reaches the loading zone in which a feeder chute, generally designated by the numeral 12, is located. As shown in FIGS. 3 and 4, the feeder chute 12 has a filling shaft the cross-section of which defines the shape of a rectangle. A flat wall surface 15 which projects outwardly and which runs diagonally downward adjoins the lower edge of the two side surfaces 14 of the filling shaft 13. This wall surface 15 extends from the back wall 16 reaching almost to the center strip 8 in the running direction of the first filter band 1 beyond the front wall of the filling shaft 13, as shown in FIG. 3. The slope of the two wall surfaces 15, their extension into the cross direction of the first filter band as well as their distance from a diaphragm 17 which supports the filter band in the loading zone, is selected in such a way that the two cover strips 9 and 10 under which the wall surfaces 15 extend and which are supported bythem, have a most favorable position relative to the center strip 8 for the filling-in of the substance to be filtered.

In order to obtain an even distribution of the substance filled in through the feeding chute 12 in the hose and to obtain a maximum holding capacity of the hose, the center strip 8 is, in the loading zone, brought into the shape shown in FIG. 4. In this case, the center strip 8 is, approximately in the areas covered by the cover strips 9, 10, bent upward, in which case, in the disclosed embodiment, these upwardly bent surfaces 8′ include an acute angle with the horizontal which is somewhat larger than the angle that the cover strips 9, 10 include with the horizontal. This deformation of the center strip 8 is obtained by the fact that, as shown in FIG. 4, the diaphragm 17 is given a corresponding profile and the center strip 8 is held in contact with the diaphragm 17 by means of wall surfaces 18 as well as a bracket 19 of the feeder chute assembly 12. The marginal zones of the center strip 8 which are connected with the cover strips 9, 10 rest on the flat edge of the diaphragm 17. As shown in FIG. 4, the wall surfaces 18 adjoin the lower edge of the wall surfaces 15, but extend, as shown in FIG. 3, from the back wall 16 in the running direction of the first filter band 1 over less than half of the length of the wall surfaces 15, so that the substance to be filtered may enter sideways into the hose in the range of the feeding chute 12, i.e., transversely to the running direction of the band 1. The bracket, with the two legs of which the lower edge of the two wall surfaces 18 is connected, is open in the running direction and supplies to the wall surfaces 18 the required mechanical stability. In addition, it holds the center area of the center strip 8 in contact with the diaphragm 17.

In the disclosed embodiment the rear wall 16 of the filling shaft 13 is not rigidly connected with the side walls, which would, of course, be possible, but within the range of its upper edge is hinged about a horizontal axis. Therefore, in the case of the view according to FIG. 3, it swings clockwise away from the filling shaft 13, if the pressure applied against it by the substance located in the filling shaft exceeds a certain value. This threshold value is selected in such a way that it is exceeded only if the quantity of substance fed to the feeding chute 12 is too large. In order to utilize the swiveling motion of the back or rear wall 16 for the control of the quantity of substance fed into the feeding chute, a signal transmitter is provided which responds to a swivel motion of the rear wall. This signal transmitter may be a switch 20 of a regulator for the control of the quantity of the substance to be filtered.

Figure 5:
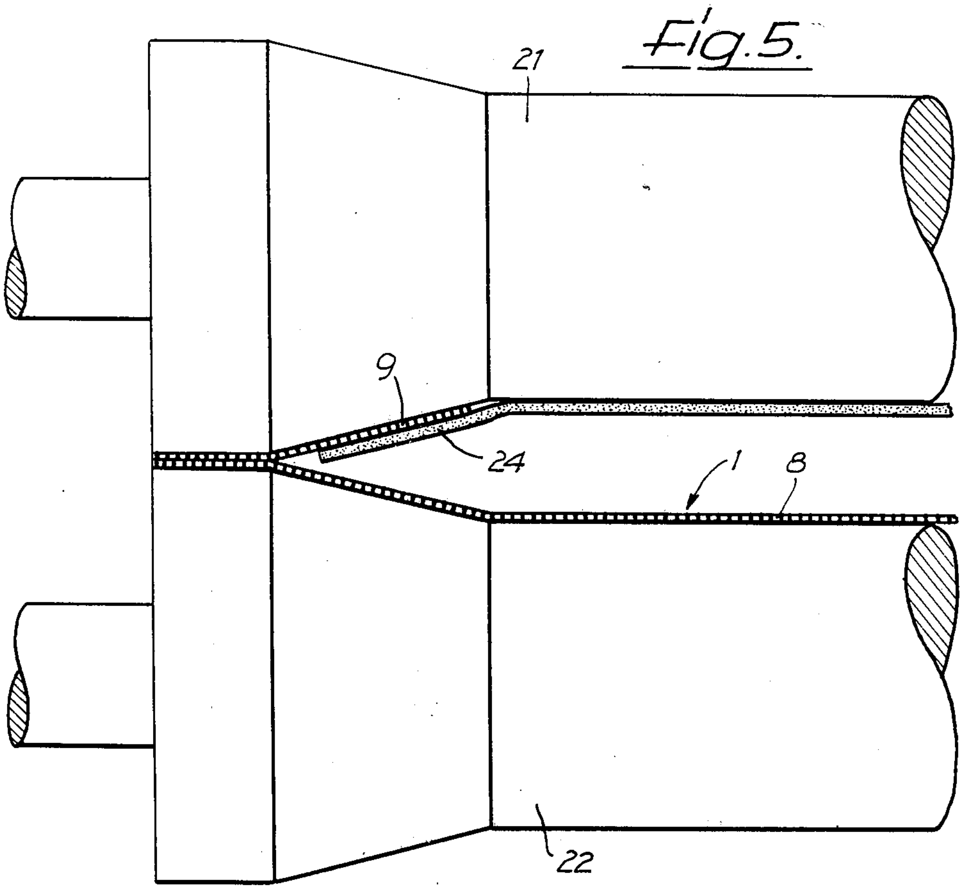
FIG. 5 is an enlarged fragmentary sectional view taken along line V—V FIG. 1, and depicts the filter band passing through a set of dosing rolls which insure an even filling of the hose.

Shortly after it has left the feeding chute 12, the first filter band 1 runs into the gap of a set of dosing rolls, 21, 22, which insure an even filling of the hose as well as the correct degree of fullness. As shown in FIG. 5, the two rolls 21 and 22 each have a center zone which is decreased in diameter in order to obtain a width of the gap which corresponds to the desired thickness of the hose. The center zone extends over the area of the center strip 8 which is not covered by the cover strips 9 and 10. The center zone is followed by a zone which has the shape of a truncated cone on both sides, so that the gap width decreases evenly toward the outside. In this case, the angle of the gap is selected in such a way that the two cover strips 9 and 10 as well as the area of the center strip 8 which is opposite to the cover strips include the desired angle with the horizontal. Cylindrical end sections of the two rolls 21 and 22 rest against the marginal zones of the cover strip 9 and 10 which are connected, respectively, with the center strip 8.

So that the substance filled into the hose cannot come out from the top, a cover band 24 is fixed at the two wall surfaces 15 of the feeding chute 12. The lateral edges of this cover band 24 rest against the bottom side of the cover strips 9 and 10, and it extends in the running direction of the first filter band 1 beyond the set of dosing rolls 21, 22 to a point at which, from above, a second filter band 25 is brought into contact with the cover strips 9 and 10.

The second filter band 25 is also continuous and forms a flush connection as to friction and form with the two cover strips 9 and 10. After the second filter band 25 has been placed on the cover strips 9 and 10, the hose, which is now also closed in the upward direction, enters a pressing zone which is formed of several sets of rolls 26 which are arranged at a distance from each other in the running direction of the hose. The distance between the rolls 26 of each set decreases from set to set, so that, as shown in FIG. 1, the hose is progressively pressed together, in which case the distance of the second filter band 25 from the center strip 8 of the first filter band 1 progressively decreases by an amount which is proportional to a continuous increase of the pressure differential across the substance to be filtered.

Figure 6:
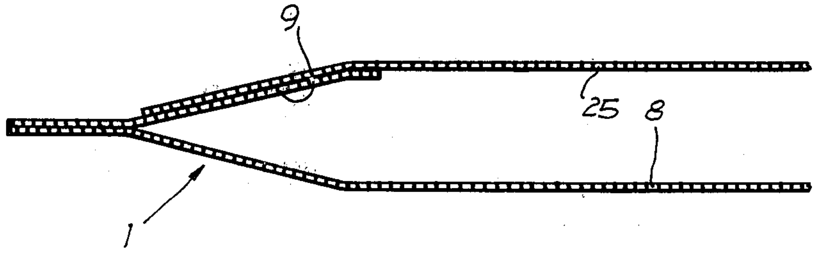
FIG. 6 is an enlarged fragmentary sectional view taken along line VI—VI of FIG. 1, and depicts the manner in which the upper portion of the hose is closed by a second filter band.
Figure 7:
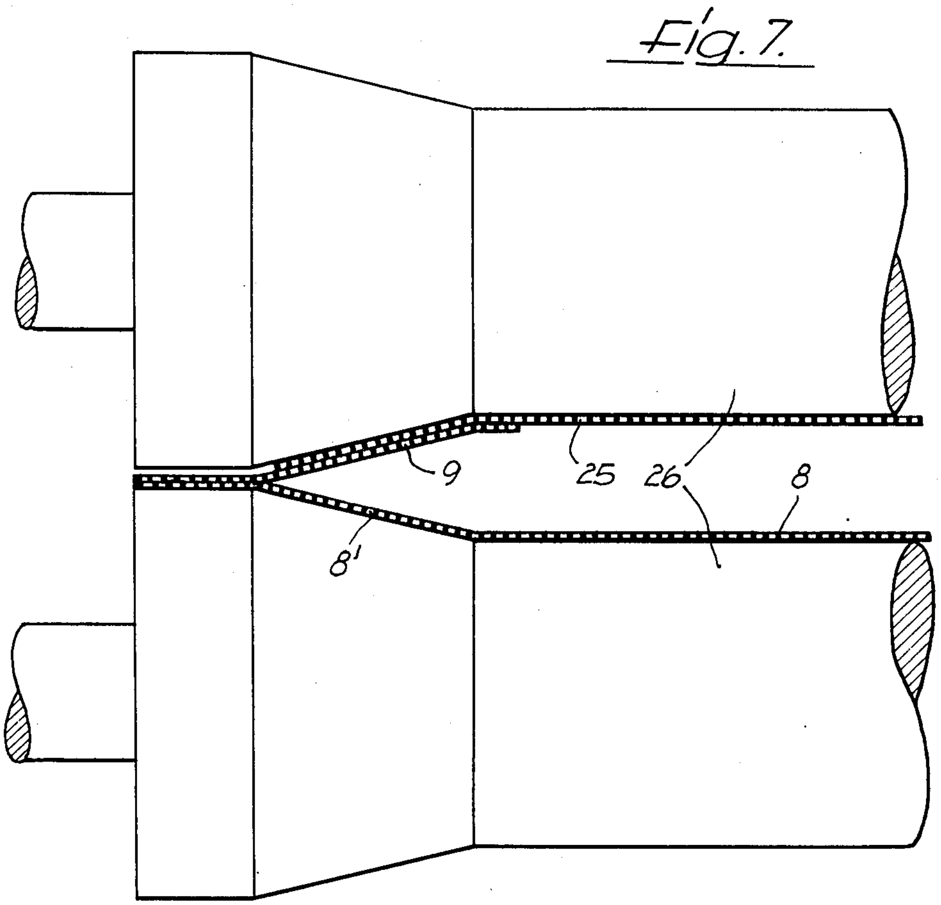
FIG. 7 is an enlarged fragmentary sectional view taken along line VII—VII of FIG. 1, and depicts the filter band passing through a set of rollers in the pressing zone.

As shown in FIG. 6, the second filter band 25 extends from the edge of the cover strip 9 connected with the center strip 8 to the corresponding edge of the cover strip 10. FIG. 6 also shows that the second filter band 25 is, in the zones which cover the two cover strips 9 and 10, bent downwardly according to the slope of the cover strips. The edges of the two cover strips 9 and 10 which point toward each other are also slightly bent, so that they are located in a plane which is parallel to the plane of the center zone of the center strip 8. This shape of the hose is obtained through the shape of the gap between leading rollers 28 and 29 of the sets of rollers 26, which are always developed like the dosing rollers 21 and 22.

Figure 8:
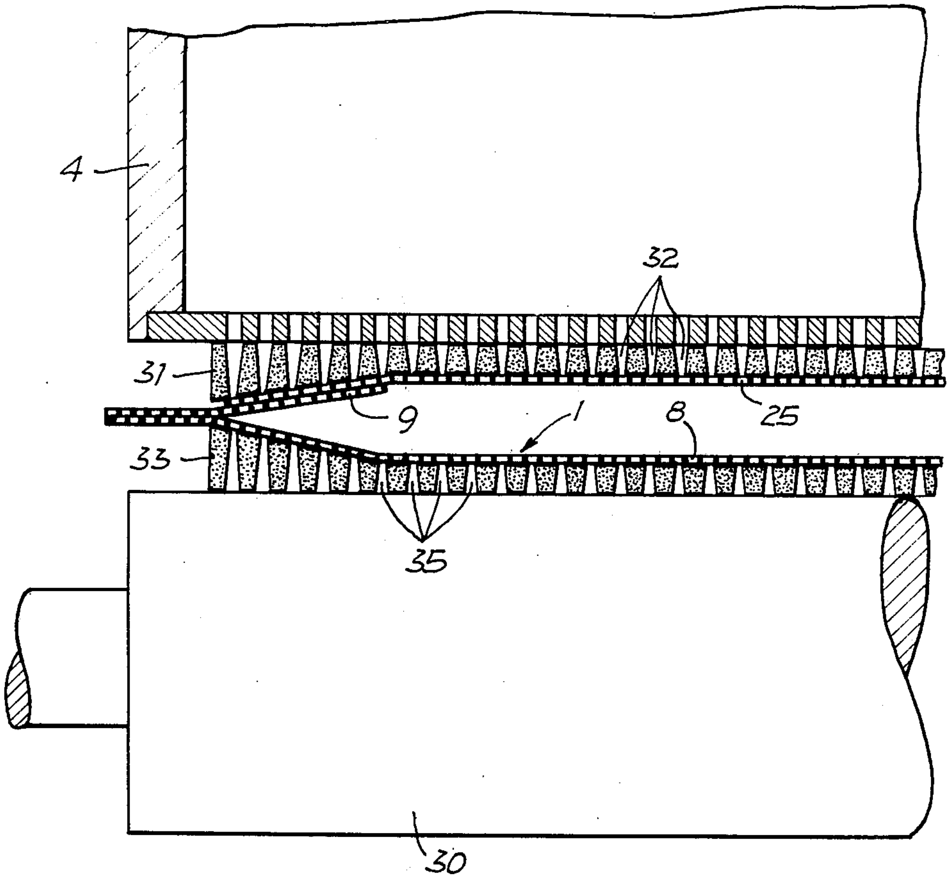
FIG. 8 is an enlarged fragmentary sectional view taken along line VIII—VIII of FIG. 1, and depicts the filter band being supported by upper and lower support bands and passing around the periphery of the presser drum.

A second section of the pressing zone adjoins that section of the pressing zone which is formed by the sets of rollers 26. In this second section, a pressure is exerted on the hose by means of the drum 4 and several backing rollers 30 by pressing these rollers 30 against the periphery of the drum 4. The formation of the pressing gap together with the drum 4, the diameter of which is, in comparison to the diameter of the rollers 30 and especially of the rollers 28 and 29, very large, assures that the increase in pressure when passing through the roller gap is less steep which is an advantage in regard to filtration. It would, of course, be possible to bring the second filter band 25 into direct contact with the drum 4 and the center strip 8 into direct contact with the rollers 30 and to give to the drum 4 as well as to the rollers 30 a profile which is adapted to the desired shape of the cross-section of the hose. However, the drum 4 and the rolls 30 have a cylindrical shape. This is possible because, as seen in FIG. 8, the periphery of the drum 4 is covered with an elastic support band 31 which is relatively strong in compression. The support band 31 is provided with a large number of gate channels 32 which conically widen from the side which is in contact with the second filter band 25 toward the side which rests on the periphery of the drum 4. As shown in FIG. 8, the cross-section profile of the support band 31 is adapted to the desired shape of the hose. A continous support band 33, which conforms to the construction of the support band, runs over the rollers 30, the two last ones of which also serve as guide rollers, as well as over an additional guide roller 34. The second support band 33 also has gate channels 35 which are constructed according to the gate channels 32. So that the liquid entering the gate channels 32 can be led off, the drum 4 has a casing provided with grooves or bores. It is, of course, also possible to arrange on the inside of the casing one or more suction boxes in order to further increase the pressure differential and thus the efficiency of the press, or to use the channels 32 only for a temporary admission of the liquid.

The liquid which was separated in the pressing zone is collected by means of collecting channels 36 which are mounted in the press frame 2 beneath the pressing zone.

After the hose has been lifted off the drum 4, the first filter band 1, which is now located on top, is, by means of the second filter band 25 which is located below, lifted off gradually, since the path of the first filter band 1 in this zone rises more steeply than the path of the second filter band 25. In the process, the filter cake releases itself by gravity from the first filter band 1 and remains on the top of the second filter band 25 which faces upwardly. Now, the second filter band 25 is guided over several carrier rollers 37 in the horizontal direction to a guide roller 38 by means of which it is directed downwardly. This releases the filter cake from the second filter band 25. A scraper 39 which bears against the second filter band 25 in the area of the guide roller 38 assists in the release of the filter cake from the second filter band 25.

After the unloading of the second filter band 25, it is led through a washing mechanism 40. Then it runs over a tension roller 41 and then again reaches the point behind the feeding chute 12 at which it is placed over the two cover strips 9, 10.

Figure 9:
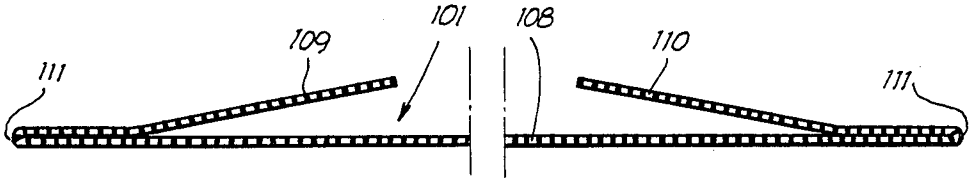
FIGS. 9–14 are transverse cross-sectional views taken through filter bands constructed in accordance with various alternative modifications of the invention.

As shown in FIG. 9, the first filter band 101 may, in the case of having the same shape as that in the embodiment shown in FIGS. 1 to 8, also be developed in one piece. In this case, the two cover strips 109 and 110 are formed while creating an edge each 111 by marginal strips which are folded inwardly over the center strip 108, which, however, preferably also in the range of the mating zones, are firmly connected with each other.

Figure 10:
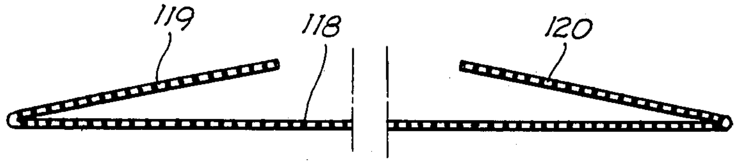
Figure 11:
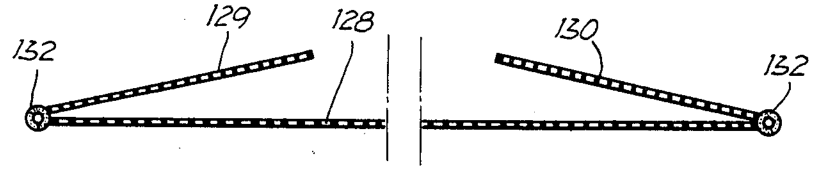

In the embodiment of FIG. 10, the first filter band is constructed such that cover strips 119, 120 are connected with center strip 118 only at their outer edges. As shown in the embodiment of FIG. 11, cover strips 129 and 130 may also be connected by means of lengthwise fastening devices 132 along their exterior edges with one or the other exterior edge of the center strip 128. As a rule, the connection by means of such lengthwise fastening devices 132 is simplified if the filter band is made of three separate bands.

Figure 12:
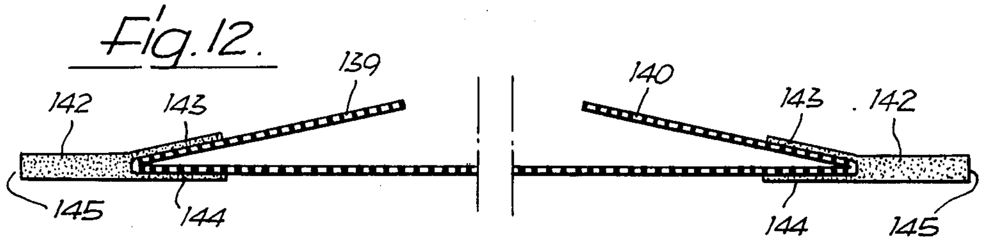

In the embodiment shown in FIG. 12, two cover strips 139 and 140 are connected with each other or additionally by means of connection strips 142. The connection strip 142 has two legs 143 and 144 against the interior surface of which the cover strips or the center strip are resting. The laterally protruding part of the connection strip 142 has a rectangular profile which provides a completely straight-lined control edge 145.

Figure 13:
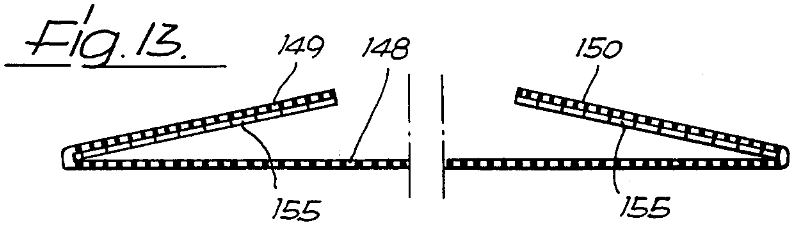

If the stiffness of the first filter band in cross-direction is not sufficient, stiffening strips may be provided. FIG. 13 shows an example in which one stiffening band 155 rests against the bottom side of each of the two cover strips 149 and 150. This stiffening band is connected firmly with the cover strips. Naturally, the center strip 148 also could be stiffened in the same way.

Figure 14:
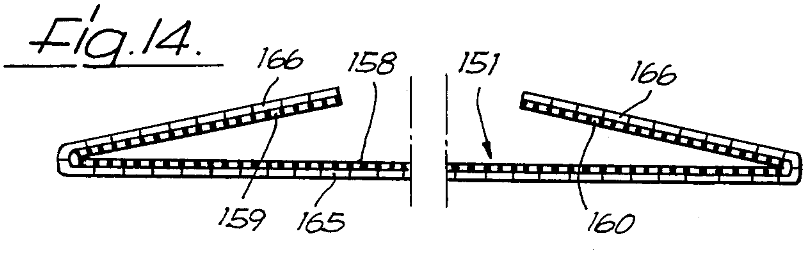

A different type of stiffening is shown in the embodiment of FIG. 14. In this case, a stiffening band 165 or 166 is placed on the exterior side of the two cover strips 159 and 160 as well as of the center strip 158. These two stiffening bands, which may also be made in one piece, are firmly connected with the first filter band 151. As shown in FIG. 14, the stiffening bands are preferably developed in such a way that they permit an unimpaired passage of the filtered liquid.

Although only preferred embodiments of the invention have been specifically illustrated and described herein, it is to be understood that minor modifications could be made therein without departing from the spirit and scope of the invention as defined in the appended claims.

I claim:

1. A band filter press for separating liquid and solid matter by pressing a mixture thereof when located within an endless filter band consisting of a lower band having a center portion and two sidewall portions connected thereto defining an enclosure, and an upper band covering said enclosure along at least a portion of the length of said lower band, said filter press comprising in combination a loading zone including means for distributing material into the enclosure defined by said lower band before said upper band is positioned thereover, a pressing zone including means for applying pressure to said filter band when said upper band is positioned over said lower band for pressing liquid through said filter band as it passes through the pressing zone, an unloading zone including means for discharging solid matter from said lower band after said upper band is removed therefrom, collection means for collecting liquid pressed through said filter band, and means constructed and arranged to connect at least the lower lateral edges of said sidewall portions of said lower band to at least the lateral edges of said center portion thereof for providing a constant width to said center portion whereby the width of said center portion does not vary as said filter band passes through said pressing zone thereby permitting tracking control of said filter band by means adapted to sense the lateral edges of said lower band.

2. A band filter press as defined in claim 1, wherein, at least when said filter band passes through said pressing zone, each of said sidewall portions encloses an acute angle with said center portion.

3. A band filter press as defined in claim 1, wherein at least said sidewall portions have a predetermined form and are constructed of a material having a degree of stiffness transversely to the running direction of the band sufficient to insure maintenance of said form through at least said loading zone.

4. A band filter press as defined in claim 1, wherein at least said sidewall portions have a predetermined form which is maintained by means of a stiffening band rigidly secured thereto.

5. A band filter press as defined in claim 1, further including a plurality of sets of rollers in said pressing zone through which said filter band is adapted to pass, said filter band having a predetermined cross-sectional profile, and wherein said sets of rollers include an inlet set having a gap therebetween defining a profile corresponding to the predetermined profile of said filter band.

6. A band filter press as defined in claim 1, further including upper and lower support bands movable with and supporting said filter band therebetween along at least part of its path of travel, said support bands including gate openings extending therethrough for the passage of the filtered liquid.

7. A band filter press as defined in claim 1, said lower band including a center zone disposed inwardly of said lateral edges thereof, and wherein said center portion and said sidewall portions, at least in the region of said center zone, define a cross-sectional profile that is substantially straight-lined.

8. A band filter press as defined in claim 1, wherein said center portion and said sidewall portions are integrally formed.

9. A band filter press as defined in claim 1, wherein said center portion and said sidewall portions are formed from three separate strips, said sidewall portions being fixedly secured to said center portion at least along said lateral edges.

10. A band filter press as defined in claim 9, further including connecting element means extending along and defining each of said edges, and wherein said connecting element means connects each of said sidewall portions with said center portion.

11. A band filter press as defined in claim 1, wherein said sidewall portions are fixedly connected to said center portion along respective longitudinally extending marginal zones of said lower band which extend inwardly from said lateral edges.

12. A band filter press as defined in claim 1, wherein said sidewall portions terminate transversely at a distance from one another forming a gap therebetween, and said upper band is disposed over said lower band covering said gap at least during the passage thereof through said pressing zone.

13. A band filter press as defined in claim 12, wherein said upper band bears against said sidewall portions forming a flush connection therewith.

14. A band filter press as defined in claim 13, further including an additional cover band which extends from said loading zone at least to the point where said upper band comes in contact with said lower band.

15. A band filter press as defined in claim 1, further comprising a loading device including a filling channel having laterally protruding wall surfaces extending under and supporting said sidewall portions in said loading zone.

16. A band filter press as defined in claim 15, said loading device further including wall surface means and bracket means connected therewith adapted to bear against and hold said center portion down during loading.

17. A band filter press as defined in claim 16, wherein said wall surface means extend longitudinally only over a portion of the longitudinal extent of said laterally protruding wall surfaces.

18. A band filter press as defined in claim 15, wherein said filling channel is defined by a filling shaft having a rear wall, said rear wall being swivally mounted and operatively coupled with a signal transmitter of a regulator adapted to control the quantity of material loaded into said loading device.

* * * * *